United States Patent
McNeill et al.

(10) Patent No.: US 6,421,706 B1
(45) Date of Patent: Jul. 16, 2002

(54) MULTICAST AND UNICAST INTERNET PROTOCOL CONTENT DISTRIBUTION HAVING A FEEDBACK MECHANISM FOR REAL-TIME AND STORE AND FORWARD INFORMATION TRANSFER

(75) Inventors: Brian L. McNeill, Richardson; Christopher N. DelRegno, Garland, both of TX (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/030,677

(22) Filed: Feb. 25, 1998

(51) Int. Cl.[7] .......................... G06F 15/16; G06F 13/00
(52) U.S. Cl. ...................... 709/204; 709/205; 709/217; 709/219; 709/231
(58) Field of Search ................... 709/204, 203, 709/217, 219, 231, 224, 232, 223, 236, 246, 205

(56) References Cited

U.S. PATENT DOCUMENTS

| | | | | |
|---|---|---|---|---|
| 4,360,827 A | * | 11/1982 | Braun | 358/85 |
| 5,726,909 A | | 3/1998 | Krikorian | 364/514 |
| 5,727,159 A | * | 3/1998 | Kikinis | 709/246 |
| 5,732,216 A | | 3/1998 | Logan et al. | 395/200.33 |
| 5,767,897 A | * | 6/1998 | Howell | 348/15 |
| 5,778,187 A | | 7/1998 | Monteiro et al. | 395/200.61 |
| 5,809,512 A | | 9/1998 | Kato | 707/502 |
| 5,812,552 A | * | 9/1998 | Arora et al. | 370/401 |
| 5,828,839 A | * | 10/1998 | Moncreiff | 709/204 |
| 5,832,229 A | * | 11/1998 | Tomoda et al. | 709/227 |
| 5,838,912 A | | 11/1998 | Poon et al. | 395/200.34 |
| 5,861,883 A | * | 1/1999 | Cuomo et al. | 345/326 |
| 5,862,330 A | * | 1/1999 | Anupam et al. | 709/204 |
| 5,867,653 A | * | 2/1999 | Aras et al. | 709/204 |
| 5,878,220 A | * | 3/1999 | Olkin et al. | 709/217 |
| 5,887,136 A | * | 3/1999 | Yasuda et al. | 709/204 |
| 5,889,950 A | | 3/1999 | Kuzma | 395/200.48 |
| 5,893,091 A | | 4/1999 | Hunt et al. | 707/3 |
| 5,916,302 A | * | 6/1999 | Dunn et al. | 709/204 |
| 5,940,391 A | * | 8/1999 | Malkin et al. | 370/390 |
| 5,963,547 A | * | 10/1999 | O'Neil et al. | 370/260 |
| 6,167,441 A | * | 12/2000 | Himmel | 709/217 |

OTHER PUBLICATIONS

Multimedia Conferencing in the Eastern Phone Environment, pp. 69–79, by Vin, H.M et al., ISSN:0018–9162, Oct. 1991.*

* cited by examiner

*Primary Examiner*—Ario Etienne
*Assistant Examiner*—Abdullahi E. Salad (57) ABSTRACT

A method and system for presenting in real-time a conference data set having document data, video data, and audio data, to a remote computing system of a remotely located conference participant. The system receives configuration data for the remote computing system and uses the received configuration data to select a conference data set format suitable for transmission to the remote computing system. The system encodes the conference data set in the selected conference data set format and selects an appropriate transmission web page for the encoded conference data set using the received configuration data. The system then transmits the encoded conference data set from the selected transmission web page over a public network to the remote computing system, wherein the remotely located conference participant accesses the encoded conference data set using a web browser. The system also transmits to the remote computing system any software required for accessing the encoded conference data set, wherein the software has been selected according to the received configuration data. The system also includes a capability for receiving chat data from the remote computing system.

37 Claims, 8 Drawing Sheets

MULTICAST AND UNICAST INTERNET PROTOCOL CONTENT DISTRIBUTION HAVING A FEEDBACK MECHANISM FOR REAL-TIME AND STORE AND FORWARD INFORMATION TRANSFER

TECHNICAL FIELD

The invention relates to providing conference presentation information to remote conference participants and, more particularly, for systems for providing conference presentation information through the World Wide Web.

BACKGROUND OF THE INVENTION

Organizations often require large meetings which must be attended by a number of participants. Such organizations are frequently comprised of persons located at disparate locations. One way for all of the conference attendees to attend the conference would be for all of the conference attendees to travel to a single location. However, arranging for all of the conference attendees to be in a particular location at a particular time creates a number of logistical and practical difficulties. Among these difficulties are the travel costs associated with making sure that all of the conference participants are at the same place at the proper time. However, regardless of the expense a conference presenter is willing to spend, another difficulty is arranging the conference at a time convenient to a vast number of people.

One prior art solution which saves an organization the expense of travel for all conference participants is teleconferencing. Teleconferencing is relatively easy to establish, but is limited and awkward to use for large numbers of participants. In addition, teleconferencing becomes quite difficult when documents become the focus of the conference. Teleconferencing also suffers from a drawback in that the remotely located conference participants do not receive any sort of visual feedback.

Video conferencing offers yet another means by which remote conference participants may participate in a conference without being physically present. Video conferencing allows visual data such as data related to participants and documents which they may present at the conference. However, video conferencing generally requires special setups and usually requires a specialized facility for receiving the video conference. Video conferencing facilities may not be available in all remote locations. In addition, all of the remote conference participants at a location having a video conferencing facility must be present in the same physical space in order to receive the video conference.

Neither standard teleconferencing nor video conferencing easily accommodates delayed review of the presentation material for remote conference participants who are unable to attend the original presentation due to time conflicts. Within a company there is a need to easily coordinate meetings where all participants have access to the same information at the same time. Time, distance and/or lack of special facilities should not preclude effective meetings.

SUMMARY OF THE INVENTION

The invention provides a method and system for presenting a conference data set to a remote computing system of a remotely located conference participant in real-time. The conference presenter receives configuration data for the remote computing system of the remotely located conference participant and uses the received configuration data to select a conference data set format suitable for transmission to the remote computing system. The conference data set comprises at least one of the conference presentation documents, conference audio data, and conference video data. The conference presenter encodes the conference data set in the selected conference data set format and transmits the conference data set over a network to the remote computing system. The conference presenter may transmit the formatted conference data set from a web page available on the World Wide Web. Conference data sets in other formats may each be transmitted from other web pages. The remote conference participant accesses the conference data set through standard web browsing software.

DETAILED DESCRIPTION OF THE INVENTION

The invention allows remote conference participants to participate in an ongoing conference by receiving information related to the conference on their individual computing systems. The remote conference participants receive the conference data from an appropriate web page which has been selected for them based upon their particular computing system. Embodiments of the invention not only allow the remote conference participants to experience the conference as it is happening, but embodiments of the invention also allow the remote conference participants to receive the conference data information in a delayed manner or in a form which they may review at their own pace. Embodiments of the invention translate the conference data into an appropriate number of formats for the various computing systems of the remote conference participants. Embodiments of the invention also allow the remote conference participants to send responses back to the conference presentation and also facilitate a capability for sending an individualized reply to the remote conference participant. The invention requires no action on the part of the remote conference participants other than possessing web browsing software and using this web browsing software to connect with an appropriate data sending web page.

The invention arises from the inventors' discovery that a complete set of conference data can be encoded from various preexisting software pieces and provided to a remote conference participant in such a manner that the remote conference participant can actively participate in a conference using the remote conference participant's own computing system, without the necessity of travel to a particular remote location. The inventors have also discovered that the conference data set can be formatted in different versions to accommodate the differing computing systems of the remote conference participants. The inventors have further discovered that the appropriate conference data set format for a given remote conference participant may be determined by receiving computing system configuration information from the remote conference participant. The inventors have also discovered that a series of web pages may be used for broadcasting the various conference data set formats to the remote conference participants.

The conference presentation source controls the conference presentation, with the remote conference participants assuming an essentially passive role. The remote conference participant of the invention is passive in terms of receiving the set of conference presentation data, and the remote conference participant needs to undertake no action other than accessing and running conventional web browsing software. The present invention leverages the bandwidth of existing networks and does not require the creation of a new network in order to transmit conference data. The conference presenter in the invention is the source for information which is provided to many participants. The invention differs from typical application sharing systems in that remote conference participants assume a passive role in the present invention and have no capability for interrupting or influencing the conference data provided to other remote conference participants. In one embodiment, the remote conference participant may send a chat query to the conference presenter, which the conference presenter may choose to share with the other remote conference participants. Thus, the present invention essentially concerns one source providing information to many recipients, rather than a system which provides a set of data with which many users interact.

Figure 1:
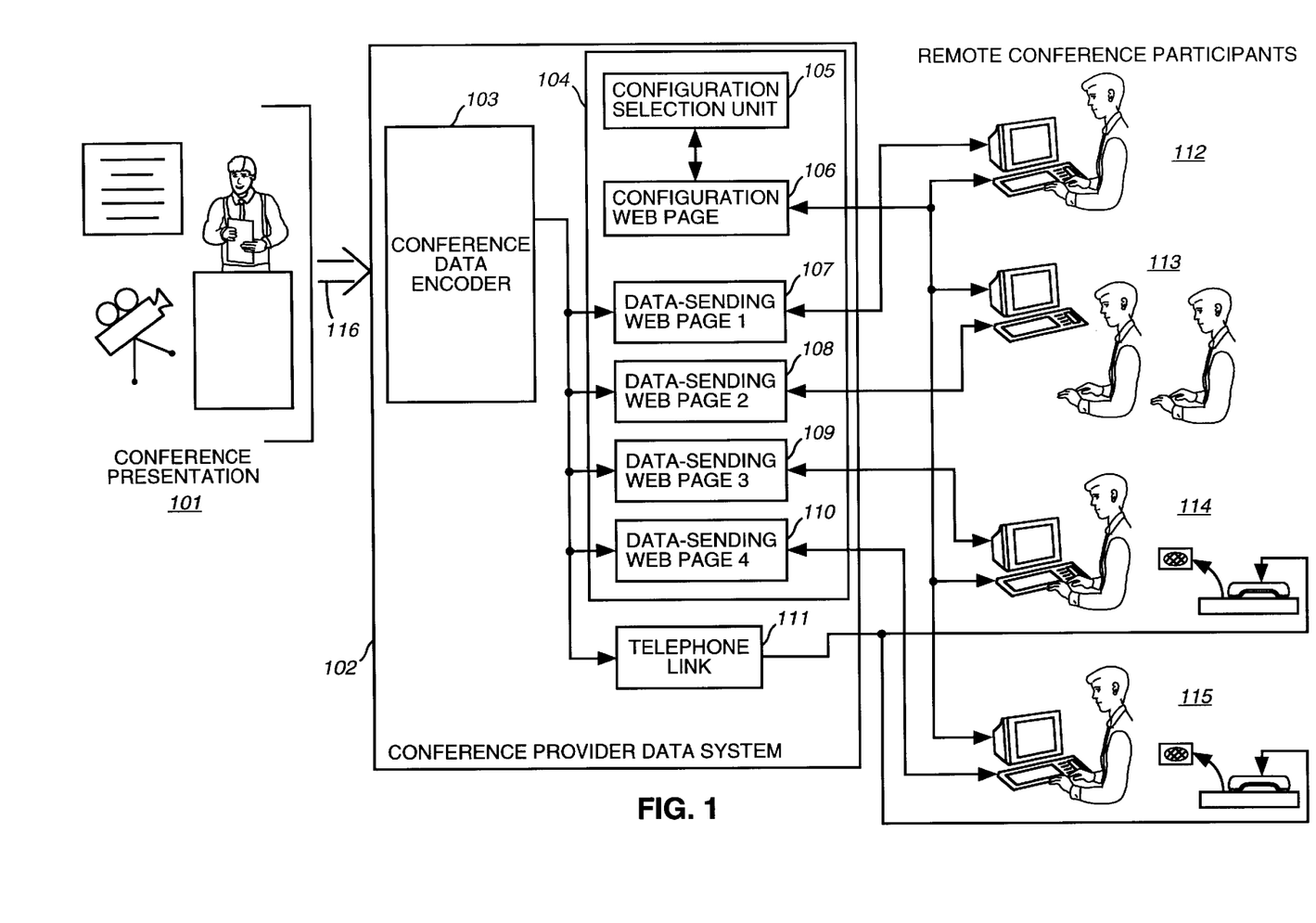
FIG. 1 provides an illustrative example of an embodiment of the invention in which information presented at a conference is provided to remote conference participants.

FIG. 1 provides an illustrative example of an embodiment of the invention in which information presented at a conference is provided to remote conference participants. In this embodiment, a conference presentation 101 provides conference data 116 to a conference provider data system 102, which processes the conference data, making this processed conference data available to remote conference participants 112, 113, 114, and 115. The conference provider data system 102 includes a conference data encoder 103, a conference provider server 104 and a telephone link 111. The conference provider server 104 includes a configuration selection unit 105, a configuration web page 106, data sending web page one 107, data sending web page two 108, data sending web page three 109, and data sending web page four 110. As provided in this exemplary embodiment, each of the remote conference participants 112–114 receives a conference data set specifically selected for their respective remote computing systems. A conference data set comprises conference document data, conference video data and conference audio data.

The conference presentation 101 generates the conference data set 116. The conference data set 116 comprises the data generated by the conference presentation 101, such as a video presentation, accompanying audio data and document data which is typically in sync with the video and audio data. The document data frequently consists of slides or graphic overheads shown in conjunction with the video data and audio data. The conference data set 116 is recorded by appropriate recording units, such as video cameras and tape recorders, as it is produced during the conference presentation 101.

The conference data encoder 103 receives the conference data set 116 and prepares the conference data set in formats appropriate for the remote conference participants 112, 113, 114, and 115. The conference data encoder 103 then sends each of the appropriately formatted conference data sets to an appropriate data sending web page. For example, as shown in FIG. 1, the appropriate data sending web page for remote conference participant 112 is data sending web page one 107. Each of the data sending web pages 107–110 have been configured to provide the appropriately formatted conference data set in a different protocol appropriate to the varying remote computer systems used by the remote conference participants.

In this embodiment, the conference presentation 101 provides the conference data set 116 to the conference data encoder 103 in real-time. The conference data encoder 103 provides the appropriately formatted conference data set to the data sending web pages in real-time as well. However, the remote conference participants have the option of receiving the appropriately formatted conference data set in either real-time or in a delayed mode. Thus, the appropriately formatted conference data set may be "presenter pushed" or may be provided to the remote conference participants as pre-compressed user parcels. Each of the remote conference participants 112–115 determines its appropriate data sending web page by contacting the configuration web page 106. The configuration web page 106 queries each remote conference participant regarding their respective remote computing systems. The configuration web page 106 provides the remote conference participants configuration information to the configuration selection unit 105. The configuration selection unit then determines, based upon the received configuration information, an appropriate data sending web page for the remote conference participant. The configuration selection unit 105 then notifies each remote conference participant, through configuration web page 106, of the location of the appropriate data sending web page for that conference participant. For example, remote conference participant 113 contacts configuration web page 106. The configuration web page 106 then queries the remote conference participant 113 regarding the remote conference participants computing system. The remote conference participant 113 then responds to the query by providing the requested configuration information. The configuration web page 106 then forwards this information to the configuration selection unit 105. Based upon the configuration information provided by the remote conference participant 113, the configuration selection unit 105 determines that data sending web page two 108 is the appropriate data sending web page for remote conference participant 113. Configuration selection unit 105 then notifies remote conference participant 113 of the location of data sending web page two 108, through configuration web page 106. When remote conference participant 113 connects to data sending web page two 108 this data sending web page will provide the computing system of remote conference participant 113 with any additional software which this remote conference participant will require in order to receive the appropriately formatted conference data set.

Some remote conference participants, such as remote conference participants 114 and 115 as shown in FIG. 1, may not have a capability for receiving audio data through their respective computing systems. For these remote conference participants, audio data may be provided through a telephone link such as that provided by telephone link 111. Thus, audio data originating at conference presentation 101 may be provided to remote conference participants 114 and 115 through the conference provider data system 102. In an alternative embodiment, the conference presentation 101 may provide a telephone link directly to the remote conference participants which does not necessarily pass through a conference provider data system.

Figure 2:
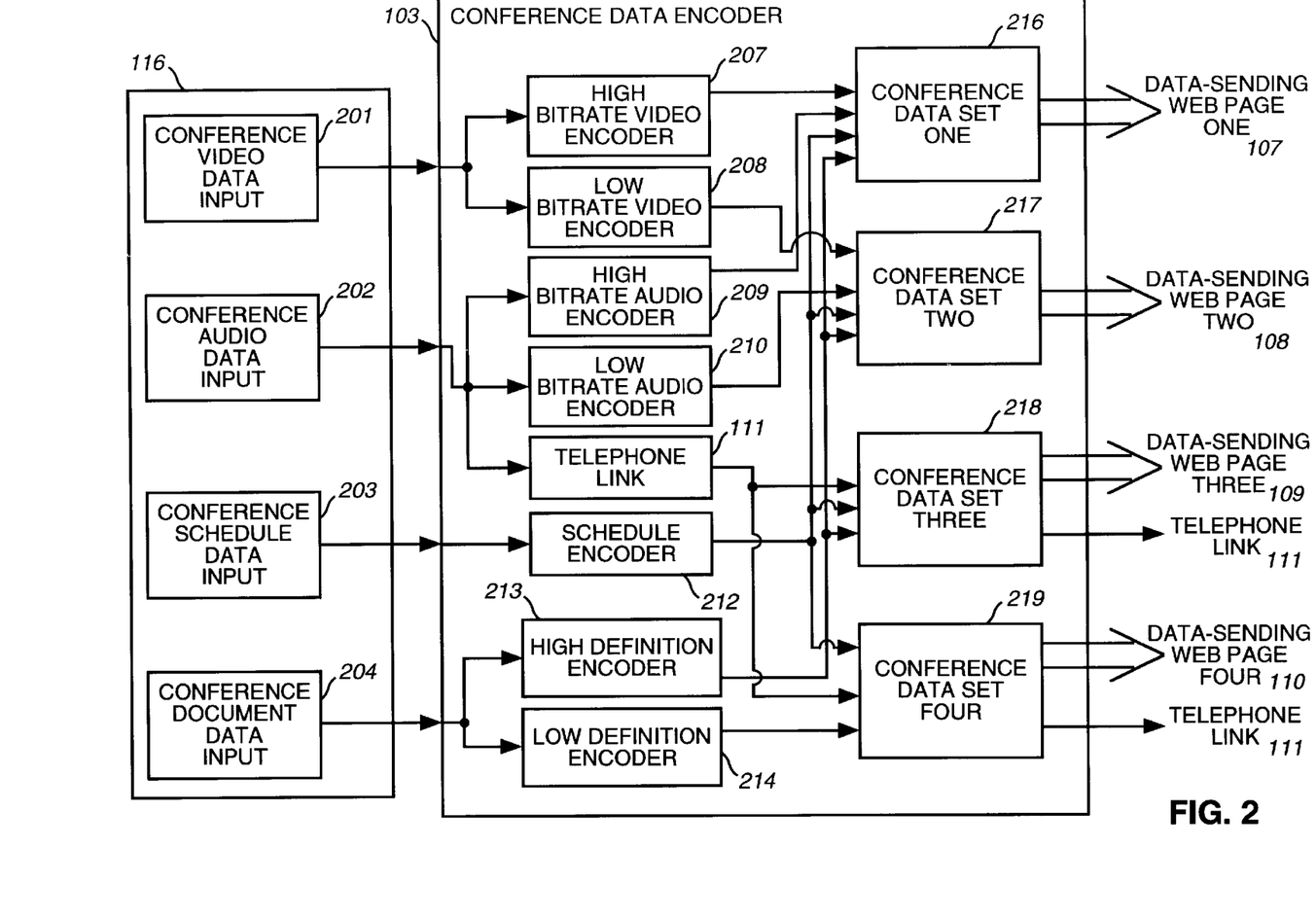
FIG. 2 provides a detailed illustration of the conference data encoder B03 according to one illustrative embodiment of the invention.

FIG. 2 provides a detailed illustration of the conference data encoder 203 according to one illustrative embodiment of the invention. The conference data set 216 includes conference video data input 201, conference audio data 202, conference schedule data input 203, and conference document data input 204. Any appropriate means, such as a video camera, may capture video data at the conference. This video data will then pass through a video capture card which then provides digitized conference video data input 201. Any appropriate means may likewise capture audio data from the conference and provide this audio data to an audio capture card which digitizes the audio data to produce conference audio data input, such as the conference audio data 202. Conference scheduling data, such as a list of persons who will provide presentations at the conference, may be captured in any appropriate means and then provided as digital conference data input, such as the conference schedule data input 203. Documents shown at the conference, such as handouts, slides from overhead projections, and other static documentation may be digitized through any appropriate medium and provided as the conference document data input 204.

The conference data encoder 103 receives each of the digital data inputs which comprise the conference data set 216. The conference data encoder accepts the conference video data input 201 and provides this video data to both a high bit rate video encoder 207 and a low bit rate video encoder 208. The high bit rate video encoder formats the conference video data input 201 in a form appropriate for multicast transmission. The high bit rate video encoder 207 compresses the conference video data input 201 and formats this data for transmission over a multicast network through a predetermined system multicast Internet protocol ("IP"). An appropriate multicast IP for the high bit rate video encoding is the sparse mode protocol independent multicast user data gram protocol/Internet protocol ("SM PIM UDP/IP"). One appropriate engine for serving as the high bit rate video encoder 207 is the Precept IP/TV, which is sold by the Precept Software, Inc. After formatting the conference video data input 201, the high bit rate video encoder 207 sends the formatted video input to a conference data set one 216.

The conference data encoder 103 also transmits the conference video data input 201 to a low bit rate video encoder 208. The low bit rate video encoder 208 formats the conference video data input 201 in an appropriate format for those remote conference participants whose computing systems are capable of receiving multimedia input but are not configured to receive video input in a multicast or broadcast mode. In other words, these remote conference participants will receive video data input in a unicast mode. The low bit rate video encoder 208 will accordingly format the conference video data input 201 in an appropriate format such as the SM PIM UDP/IP packets. An appropriate engine for the low bit rate video encoder 208 is Progressive Networks Realmedia™ server. Once the low bit rate video encoder 208 has encoded the conference data input 201, the low bit rate video encoder 208 then provides this video information to conference data set two 217.

The conference data encoder 103 receives conference audio data input 202 and provides it to both a high bit rate audio encoder 209 and a low bit rate audio encoder 210. The high bit rate audio encoder 209 encodes the conference audio data input 202 into a format suitable for a multicast or broadcast transmission and provides the reformatted audio data input to conference data set one 216. A suitable format for encoding the conference data audio input 202 for multicast or broadcast transmission is the SM PIM UDP/IP protocol. Precept's IP/TV is an appropriate engine for encoding the conference audio data input 202 in a format suitable for multicast or broadcast transmission.

The low bit rate audio encoder 210 receives the conference audio data input 202 and formats this audio input in a format suitable for unicast transmission. The low bit rate audio encoder 210 then provides the unicast audio data input to conference data set two. A suitable format for encoding the conference audio data input 202 for unicast transmission is by using the SM PIM UDP/IP packets. Progressive Networks Realmedia™ provides a suitable engine for encoding the conference audio data input 202 in a format suitable for unicast transmission.

The conference data encoder 103 also routes the conference audio data input 202 through the telephone link 111 which is then provided to conference data set three 218 and conference data set four 219. Both of these conference data sets will be provided to remote conference participants whose computing systems do not have an audio capability.

The conference data encoder 103 provides the conference schedule data input 203 to schedule encoder 212. The conference schedule data input 203 typically represents information related to the schedule of events at the conference. This data may include the time for particular individual presentations and may include the name of the person presenting as well as the time for the scheduled presentation. Therefore, this information is typically static in nature. The schedule encoder 212 formats the conference schedule data input into a format suitable for transmission from a web browser. The schedule encoder 212 then provides the formatted conference schedule data to conference data set one 216, the conference data set two 217, the conference data set three 218 and the conference data set four 219.

The conference data encoder 103 provides the conference document data input 204 to both a high definition encoder 213 and a low definition encoder 214. The conference document data input 204 typically represents slide or overhead information which is produced by an application program under the control of the conference presenter. The high definition encoder 213 formats the conference document data input 204 in a format equivalent to that of the application program which created the conference document data. The high definition encoder 213 then provides this formatted conference document data input 204 to conference data set one 216, the conference data set two 217, and the conference data set three 218. The conference data set one 216 may typically receive the document data input 204 in the SM PIM UDP/IP protocol. The conference data set two 217 typically receives the formatted conference document data input 204 in a SM PIM UDP/IP packet format and the conference data set three 218 receives the conference document data input 204 in a unicast user data gram protocol/Internet protocol packet format.

The low definition encoder 214 encodes the conference document data input 204 in a format suitable for remote computing systems which have few sophisticated features. Thus, the low definition encoder 214 would not transmit the document to the formatted document data input in a format similar to that of the application program which created the document data input but would instead provide the formatted document data input in a simpler format such as an HTML format.

The conference data sets may then be provided to the appropriate data sending web page. For example, the conference data set one 216 is provided to the data sending web page one 107. The conference data set two 217 is provided to the data sending web page two 108. The conference data set three 218 is provided to a data sending web page three 109 and its audio information is provided through a telephone link 111. The conference data set four 219 is provided through data sending web page four 110 and to telephone link 111.

Likewise, the conference data sets are also provided to a memory device suitable for delayed transmission of the conference data set.

In all cases, the information in the conference data set has been compressed and encoded in an appropriate format suitable for transmission to a remote computing system. Thus, the conference data set may be provided to the remote computing system either in a "presenter-pushed" format or may be provided in a manner suited for delayed transmission.

In an alternative embodiment, the high bit rate video encoder and the high bit rate audio encoder may comprise a single device which encodes both audio and video data at the same time. Likewise, in this alternative embodiment, the low bit rate video encoder and the low bit rate audio encoder may also comprise a single device.

Figure 3A:
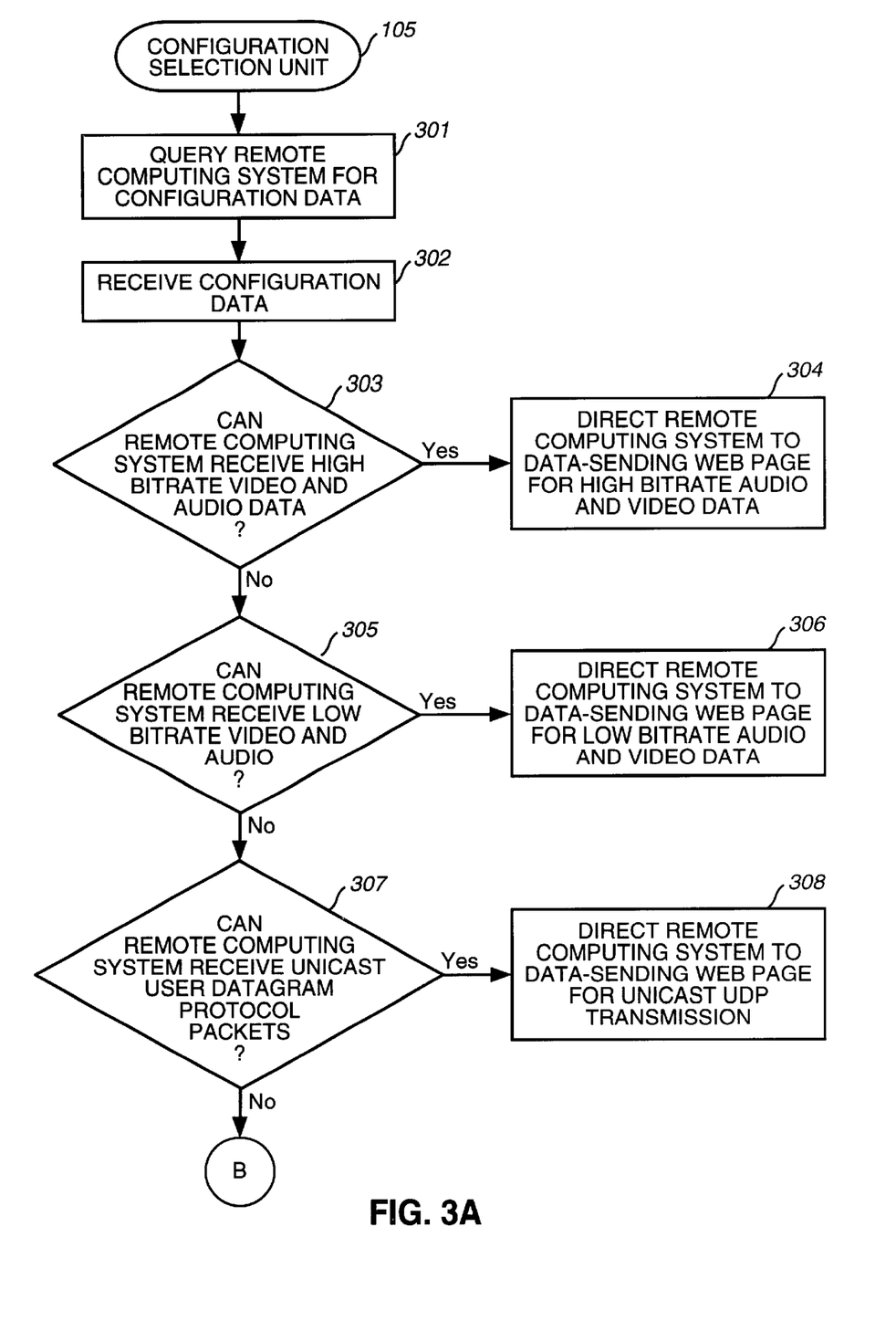
FIGS. 3A and 3B provide a flowchart illustrating steps performed by a configuration selection unit in determining which conference data set format is the appropriate conference data format for a given remote participant.
Figure 3B:
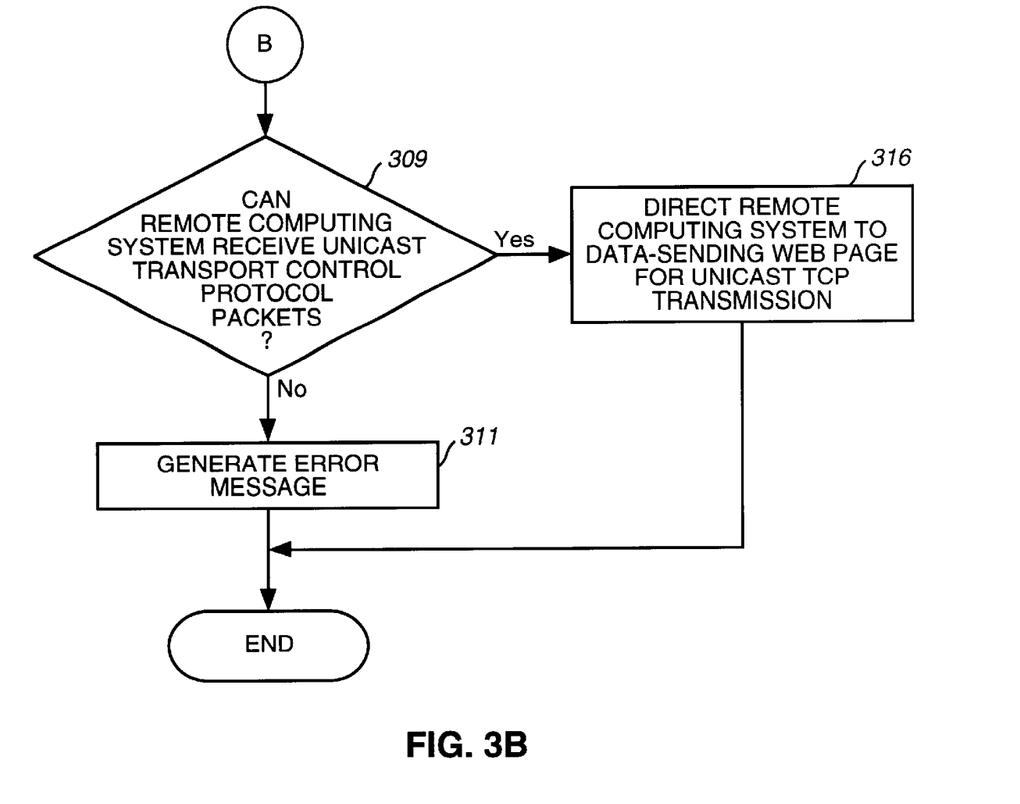

FIGS. 3A and 3B provide a flowchart illustrating the steps performed by the configuration selection unit 106 in determining which conference data set format is the appropriate conference data format for a given remote conference participant. As previously discussed, the remote conference participants each contact a configuration web page 106 which forwards configuration information from the remote conference participant to a configuration selection unit 105 which determines, based upon the information provided, the appropriate data sending web page for the remote conference participant based on the participant's computing capabilities. The configuration selection unit 105 sends a query to the remote computing system asking for configuration data (step 301). The configuration web page 106 receives the configuration data and forwards it to the configuration selection unit 105 (step 302). The configuration selection unit 105 analyzes the received configuration data to determine if the remote computing system can receive high bit rate video and audio data (step 303). If the remote computing system can receive high bit rate video and audio data then the configuration selection unit 105 directs the remote computing system to the location of the data sending web page for high bit rate audio and video data (step 304). If the remote computing system does not have the capability for receiving high bit rate video and audio data, then the configuration selection unit 105 determines if the remote computing system can receive low bit rate video and audio data (step 305). If the remote computing system can receive low bit rate video and audio data, then the configuration selection unit 105 directs the remote computing system to the location of the data sending web page for low bit rate audio and video data (step 306). If the remote computing system cannot receive low bit rate video and audio data, then the configuration selection unit 105 determines if the remote computing system can receive data formatted in the unicast user data gram protocol (step 307). If the remote computing system can receive data in this format, then the configuration selection unit 105 directs the remote computing system to the location of the data sending web page for unicast UDP transmission (step 308). If the remote computing system cannot receive data in the unicast UDP format, then the configuration selection unit 105 determines if the remote computing system can receive data formatted in the unicast transport control protocol packet (step 309). If the remote computing system can receive data according to this format, then the configuration selection unit 105 directs the remote computing system to the location of the data sending web page for unicast TCP transmission (step 316). If the remote computing system cannot receive data according to this format or any of the other accepted formats, then the configuration selection unit generates an error message which is transmitted to the remote computing system (step 311).

Figure 4:
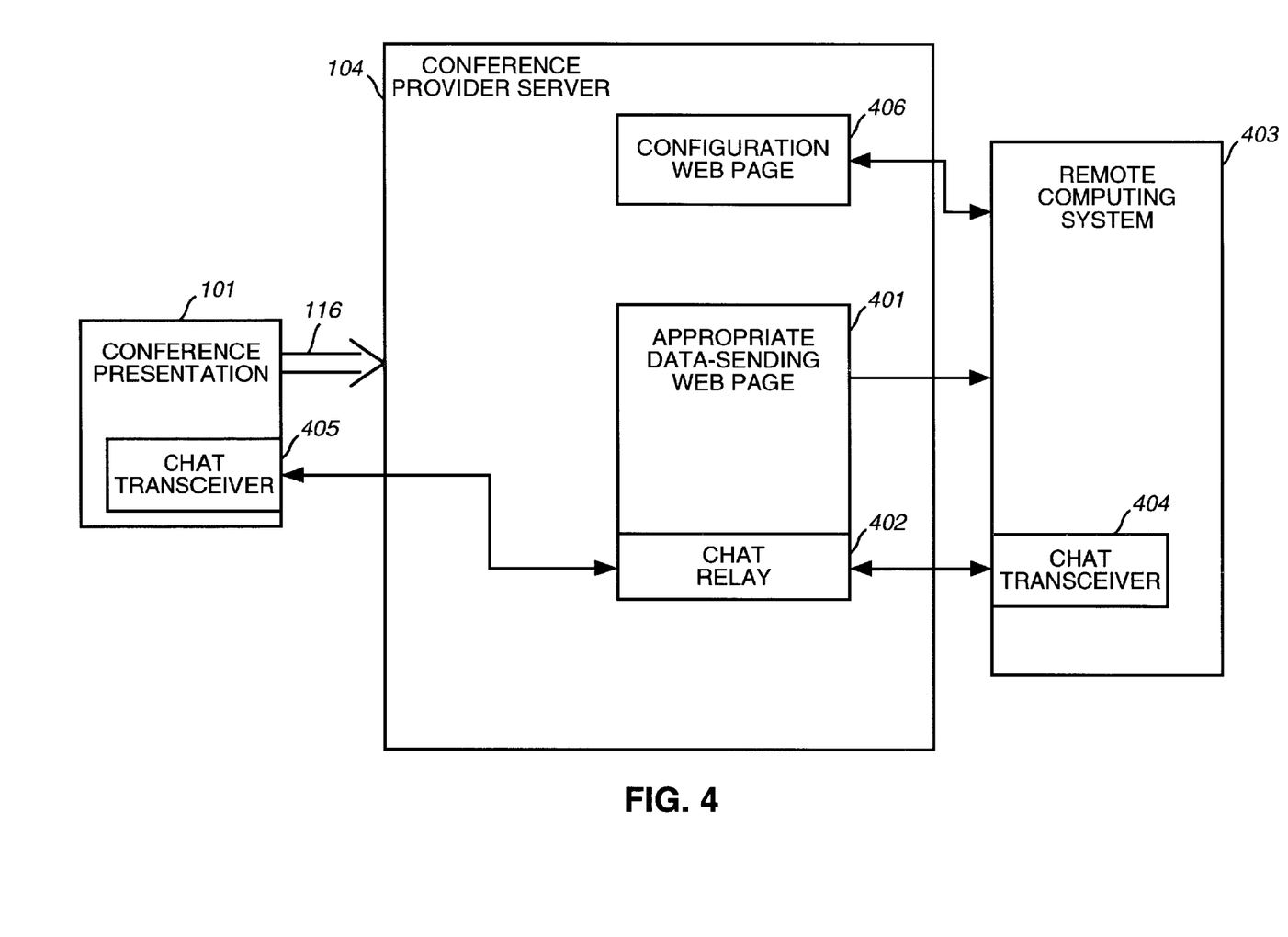
FIG. 4 depicts an illustrative embodiment of the invention which has been configured for the transmission of chat data between the remote computing system and the conference presentation.

FIG. 4 depicts an illustrative embodiment of the invention which has been configured for the transmission of chat data between the remote computing system and the conference presentation. In this embodiment of the invention, the conference presentation 101 provides the conference data set 116 to the conference provider server 104 which formats the conference data set 116 in an appropriate number of formats for the computing systems of the various remote conference participants. The remote conference participants locate an appropriate data sending web page for their respective computing systems using the configuration web page 106 as previously discussed. As shown in FIG. 4, remote computing system 403 receives a properly formatted conference data set from the appropriate data sending web page 401. In this embodiment of the invention, the remote conference participant may send information back to the conference presentation 101. This chat information may be in the form of questions or comments related to the information presented at the conference or information included in the conference data set 116. The remote conference participant uses a chat transceiver 404 which is included in the remote computing system 403. The chat transceiver 404 forwards information from the remote conference participant to a chat relay 402 in the conference provider server 104. The chat relay 402 provides the remote conference participants' chat data to the chat transceiver 405 at the conference presentation 101. The chat transceiver 405 provides the chat data to the conference presentation 101. The conference presentation 101 receives the chat data through a suitable medium, such as a telephone, a computer monitor, or even by facsimile. Either a remote system or an actual conference presenter studies the chat data and may provide an appropriate response. A response from the conference presentation 101 would be provided to the chat transceiver 405. The chat transceiver 405 would provide the response to the chat relay 402 which would in turn forward the information to the chat transceiver 404 where it would be received by the conference participant. The person or persons monitoring the chat data at the conference presentation 101 could be the person actually presenting information at the conference or it could be a person designated to monitor chat data and provide an appropriate response. The ability to transmit chat data between remote conference participants and the conference presentation 101 allows the conference to have question and answer capabilities.

Figure 5:
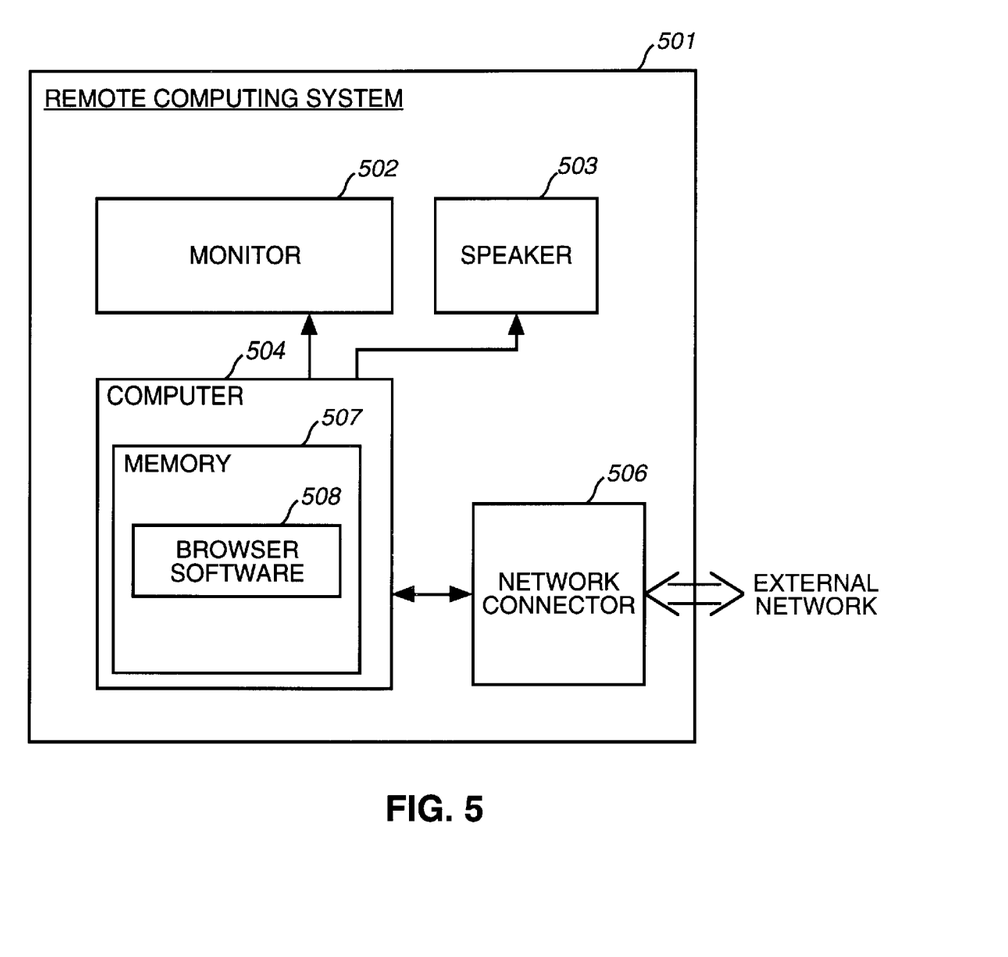
FIG. 5 provides an exemplary remote computing system for use by a remote conference participant in conjunction with the invention.

FIG. 5 provides an exemplary remote computing system for use by a remote conference participant in conjunction with the invention. As shown in FIG. 5, remote computing system 501 includes a monitor 502, a speaker 503, a computer 504 and a network connector 506. The computer 504 includes a memory 507 which includes browser software 508. The browser software 508 may be any software appropriate for receiving data over the World Wide Web. Two suitable web browsers are Netscape and Internet Explorer.

The multicast, high-bandwidth encoder compresses the audio and video and formats it for transmission over the Multicast network via a predetermined system multicast IP and a port for each of the audio and video streams. The remote conference participant, via an embedded configuration file, contacts the multicast server for participation. The multicast server approves the participation and begins the stream via appropriately configured routers. The client machine listens to the multicast IPs via the predetermined ports to receive the encoded video and audio packets. The data is removed from the packetized transport mechanism and decompressed and presented via the video and audio interfaces, respectively.

Figure 6:
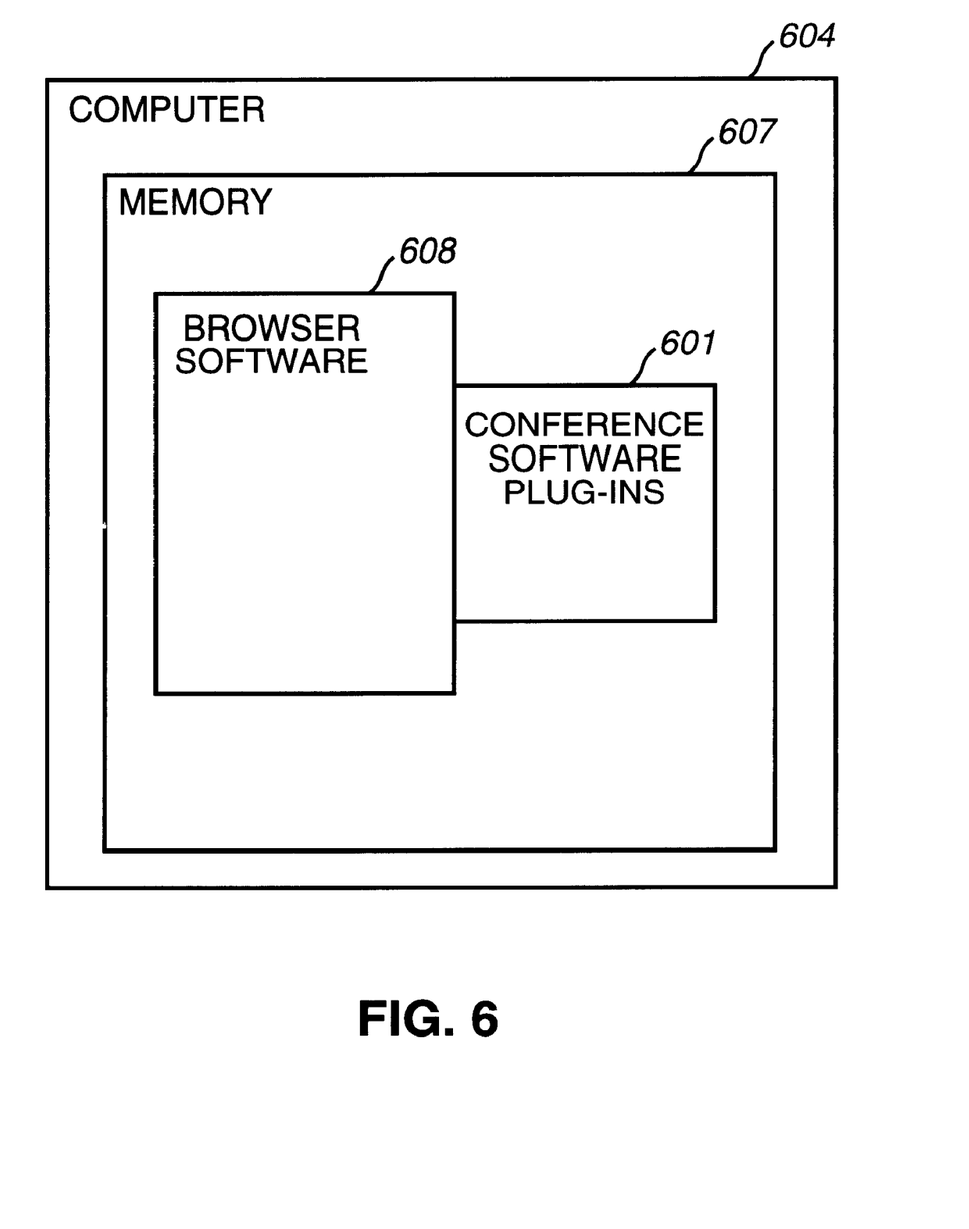
FIG. 6 provides an exemplary embodiment of the computer 504 for use with the remote computing system 501.

FIG. 6 provides an exemplary embodiment of the computer 504 for use with the remote computing system 501. In computing system 504, the browser 508 has had added to it various conference software plugins 601. These plugins 601 are small software programs that "plug in" to the browser software 508 to provide added functionality. Plugins permit the web browser 508 to access and execute files embedded in HTML documents that are in formats the browser would not normally recognize, such as animation video and audio files. Most plugins are developed by software companies who have proprietary software in which the embedded files are created.

As previously discussed, the data sending web page one 107 provides the conference data set 116 in a broadcast or multicast format. Table T1 provides appropriate the links to an SDP file for use in this broadcast mode that was referenced from the web page's HTML.

TABLE T1

[programs]
SampleSDpentry=1
;      Do not change any field except those indicated.
[SampleSDPEntry]
;      In the mvideo=line, change 23768 to the UDP
;      port to be used for the video packet stream.
mvideo=video 49152 RTP/AVP 31 96
;      In the maudio=line, change 49152 to the UDP
;      port to be used for the audio packet stream.
maudio=audio 16384 RTP/AVP
0 3 5 10 11 96 97 98 99 100 101 102 103 104 105
;      In the cvideo=line, change 239.255.0.1 to the IP
;      address to be used for the video packet stream.
;      Change the final 1 to the IP Multicast Range for the session.
cvideo-IN IP4 239.192.1.1/128
;      In the caudio=line, change 239.255.0.1 to the IP
;      address to be used for the audio packet stream.
;      Change the final 1 to the IP Multicast Range for the session.
caudio=IN IP4 239.192.1.1/128
a1=video rtpmap:96 WBIH/90000
a2=audio rtpmap:96 L8/11025
a3=audio rtpmap:97 L8/22050
a4=audio rtpmap:98 L8/44100
a5=audio rtpmap:99 L16/11025
a6=audio rtpmap:100 L16/22050
a7=audio rtpmap:101 L8/11025/2
a8=audio rtpmap:102 L8/22050/2
a9=audio rtpmap:103 L8/44100/2
a10=audio rtpmap:104 L16/11025/2
a11=audio rtpmap:105 L16/22050/2

The embed line for the HTML is:
<embed src="webforum.sdp" align="top" border="0" width="240" height="180" autostart="true" loop="true">.

The browser then knows to look in the SDP file for the rest of the information. The SDP file is located on the server and will launch Precept's IP/TV Viewer in the web browser. Before the server that is hosting the web site will launch the IP/TV Viewer a MIME change needs to be added to that server so that it knows what a SDP file is. That MIME change is to be placed in the MIMEmap area in the servers' registry, "Application/x-sdp, sdp,5." MIME stands for Multipurpose Internet Mail Extensions. MIME extends the Simple Mail Transfer Protocol ("SMTP") to permit data, such as video, sound, and binary files to be transmitted by Internet e-mail without having to be translated into ASCII format first. Once these changes have taken place the audio and video is shown to the remote conference participant.

Data sending web page two 108 provides the conference data set 116 in a format suitable for unicast audio and video. The following MIME change needs to be added to the MIMEMAP area of the servers' registry: "audio/x-pn-realaudio,ram,,<" and "audio/x-pn-realaudio-plugin, rpm,,<". Table T2 provides the appropriate plugins for the web browser 508. This interface to the plugin differs if the remote conference participant uses Netscape or Internet Explorer. If the remote conference participant uses Internet Explorer, then the remote conference participant gains access via ActiveX plugin, while Netscape needs an Embed line in the HTML. JavaScript determines the browser type then links it the proper way to the plugin. As previously discussed, the high definition encoder 213 encodes the conference document data input 204 in a format suitable for transmission to conference data set one 216, conference data set two 217 and conference data set three 218.

TABLE T2

<script language="JavaScript"><!--
if (navigator.appName=="Microsoft Internet Explorer"){
document.write("<center><object id='RAOCX' name=
'WebforumLiveAudio'"):
document.write("classid='clsid:
CFCDAA03-8BE4-11CF-B84B-0020AFBBCCFA'");
document.write("align='baseline' border=
'5' width='240' height='180'>"):
document.write("<param name='SCR'
value='pnm://Int.mcit.com/WebForum/webforum.rm'>");
document.write("<param name='controls' value='ImageWindow'>");
document.write("<param name+'AUTOSTART' value=
'TRUE'><(/object></center></p>");
}
if (navigator.appName=="Netscape"){
document.write("<p><center><embed scr=
'webforum.rpm' align='baseline' border='5'
width='240'");
document.write("height='180' autostart=
'TRUE' controls='ImageWindow'");
document.write("></center></p>");
};

Table T3 provides the appropriate plugins needed for this capability on the web browser 508. Microsoft's Internet Chat Server, placed on the server hosting the web pages, provided the chat services. With this the remote conference participant could log into the chat server via the web page. The interface between the browser and the server was Ichat's Plugin version 2.2, which was provided to all the remote conference participants. This plugin is a separate application that can be installed on the computing system of the remote conference participant. The server will need a MIME addition to the MIMEMAP area in the registry. The ActiveX plugin for Internet Explorer is "application/x-chat, chat,,;" and the plugin for Netscape is "application/x-nschat, nsc,,;". The server also requires a CHAT file containing the chat server's IP information, "TITLE MCI Webforum Chat, SERVER 166.35.225.245, PORT 6667, CHANNEL webforum."

The web page once again had a different interface depending on whether the remote conference participant used Netscape or Internet Explorer. JavaScript determines the remote conference participant's browser. If the browser is the Internet Explorer, then an ActiveX plugin link it to the chat server, and if the remote conference participant uses Netscape, then a plugin is embedded in the HTML.

TABLE T3

```
<script language="JavaScript">
<!--Hide from older browsers
if (navigator.appName=="Microsoft Internet Explorer")
{
    document.write('<oject id="WebForumChat" name=
    "WebForumChat"');
    document.write ('classid=
    "CLSID:430DDE24-C051-11CF-95BE-0020AFF75E4F"');
    document.write('align="basline" border="1"><param');
    document.write('name="_ExtentX" value=
    "16000"><param name="_ExtentY"
value="4900"><param');
    document.write('name"_Stockprops" value=
    "0"><param name="CONNECTTYPE"');
    document.write('value="IRC"><param name="SERVER"
value="166.35.225.245"><param');
    document.write('name="PORT" value=
    "6667"><param name="USERNAME"
value="Nick"><param');
    document.write('name="CHANNEL" value=
    "WebForum"><param
name="DISABLEFILEXFER"');
    document.write('value="-1 "><paramname=
    "TITLE" value="WebForum
Chat"><paramname="ROOM"value="#webforum"></object>');
}
if (navigator.appName=="Netscape")
{
    document.write('<embed scr=
    "http./166.35.225.245/chat/webforum.chat"
align=baseline"');
    document.write('border="0" width="600" height=
    "190" channel="#webforum"');
    document.write('connectionstartup="TRUE" connecttype="IRC"
disablefilexfer="true"');
    document.write('id="xchat1"
    left="0" top="0" port="6667"
server="166.35.225.245"');
    document.write('title=
    "MCI WebForum, February 1997" username="Common">');
}
//Stop Hiding-->
</script>
```

For the other remote conference participants, Table 4 provides the Power Point Animation Player which was installed onto the computing systems of the remote conference participants. In addition, appropriate MIME types were added in the MIMEMAP area on the server to enable this capability.

TABLE T4 application/ms-powerpoint.pot . . 5
application/ms-powerpoint.pps . . 5
application/ms-powerpoint.ppz . . 5

To do this, a separate HTML page was created for the conference presenters and link that page to their files that were kept on the server. An example for one of the presentations is as follows.

```
<object classid="clsid:EFBD14F0-6BFB-11CF-9177-
    00805F8813FF" aign="absmiddle" border="0" width=
    "340" height="265" >
<param name="File" value="/webforum/presentations/
    Troy/pres0.ppz" >
<embed src="/webforum/presentations/Troy/pres0.ppz"
    align="absmiddle" border="0" width="340" height=
    "257"></object>
```

This HTML file did not need to know which browsers was used it just needed the EMBED line for the individual presentation.

Figure 7:
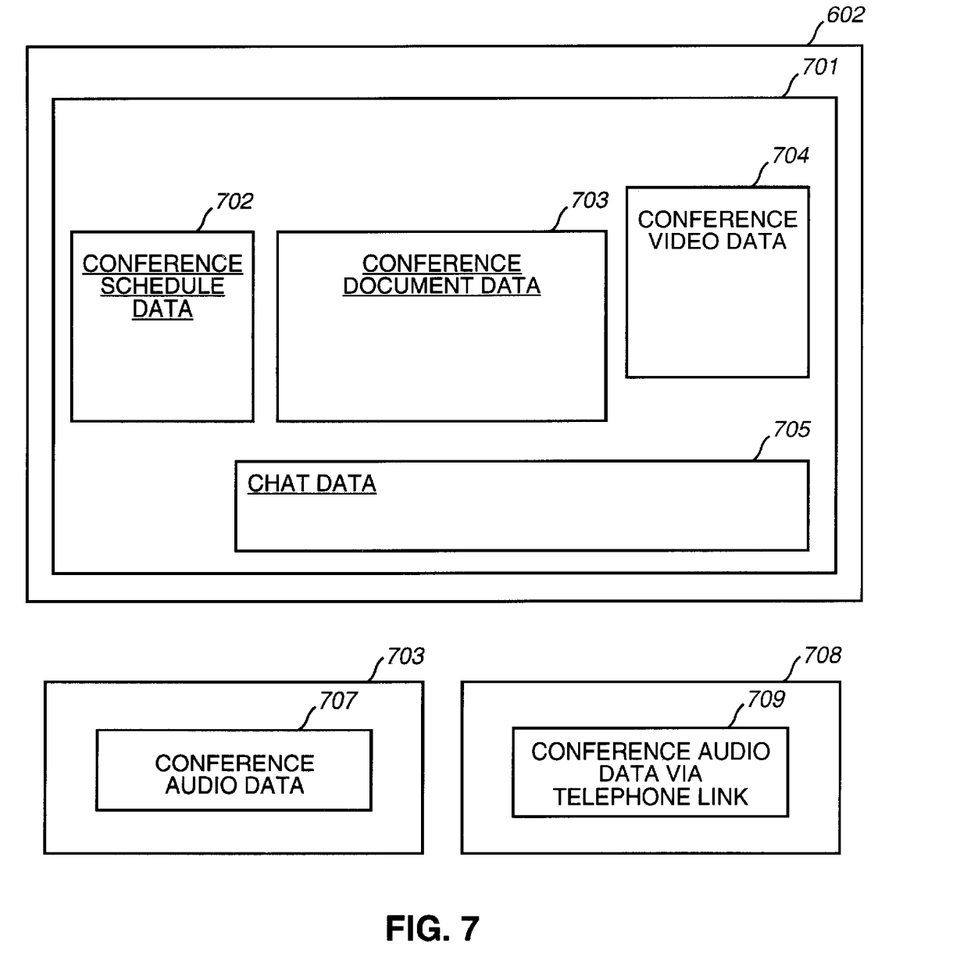
FIG. 7 illustrates an exemplary user interface in connection with an embodiment of the invention.

FIG. 7 illustrates an exemplary user interface in connection with an embodiment of the invention. In this embodiment, the monitor 502 displays the video information from the conference data set 116. The speaker 503 of the remote computing system 501 displays audio data. In addition, the conference audio data is provided from a telephone 708. The video user interface 701 displays conference schedule data 702, conference document data 703, conference video data 704 and conference chat data 705. The conference schedule data 702 depicted in this figure at the left, typically includes static information relating to scheduling at the conference.

The conference document data 703 typically relates to documents which are being displayed at the conference. The conference video data 704 typically displays the presenter at the conference. The chat data 705 provides a means for the conference participant to communicate with the conference presentation 101. Conference audio data 707 is typically linked with the conference video data 704 and the conference document data 703. Likewise, conference audio data provided by a telephone link 709 would also be synchronized with the conference document data 703 and the conference 35 video data 704. Thus, the set of conference document data 703, conference video data 704 and conference audio data 707 provide the remote conference participant with the information provided immediately presently provided at the conference presentation 101. This set of synchronized information essentially allows the remote conference participant to participate in the conference presentation 101 as if the remote conference participant was physically present. The conference schedule data 702 allows the remote conference participant to determine how long the present presentation at the conference is scheduled to last as well as what presentations are coming next. The chat data 705 allows the remote conference participant to provide feedback information to the conference presentation 101 and the remote conference participant may also receive an individualized response to any chat data generated by the remote conference participant.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of presenting in real-time a conference data set having document data, video data, and audio data, to a remote computing system of a remotely located conference participant, comprising:

receiving configuration data for the remote computing system and using the received configuration data to select a conference data set format suitable for transmission to the remote computing system;

encoding in real time the conference data set in the selected conference data set format;

generating in real time a plurality of transmission web pages based on respective configuration data received from the remote computing system and other remote computing systems, each of the transmission web pages providing the conference data set in respective encoded formats;

selecting a transmission web page from the plurality of transmission web pages based on the received configuration data, the selected transmission web page providing the conference data set in the selected conference data set format; and transmitting the encoded conference data set from the selected transmission web page over a public network to the remote computing system, for the remotely located conference participant to access using a web browser.

2. The method of claim 1, further comprising transmitting to the remote computing system a software application for accessing the encoded conference data set, wherein the software has been selected according to the received configuration data.

3. The method of claim 1, further comprising:

receiving chat data from the remote computing system; and transmitting the chat data to a conference presentation device.

4. The method of claim 1 wherein the public network is an internet.

5. The method of claim 1 wherein the public network is an intranet.

6. The method of claim 1 wherein the encoded conference data set does not include video data in accordance with the received configuration data.

7. The method of claim 1 wherein the encoded conference data set does not include audio data in accordance with the received configuration data.

8. The method of claim 6 wherein the encoded conference data set does not include audio data in accordance with the received configuration data.

9. A method of presenting a conference data set to a remote computing system of a remotely located conference participant in real-time, comprising:

receiving configuration data for the remote computing system of the remotely located conference participant and using the received configuration data to select a conference data set format suitable for transmission to the remote computing system;

generating in real time a plurality of transmission web pages based on respective configuration data received from the remote computing system and other remote computing systems, each of the transmission web pages providing the conference data set in respective encoded formats; and selecting a transmission web page from the plurality of transmission web pages based on the received configuration data, the selected transmission web page providing the conference data set in the selected conference data set format.

10. The method of claim 9, further comprising transmitting the conference data set in the selected conference data set format over a network to the remote computing system.

11. The method of claim 9 wherein the conference data set in the selected conference data set format comprises separately encoded pieces of the conference data set.

12. The method of claim 10 further comprising transmitting the conference data set in the selected conference data set format to the remote computing system from the web page selected for the remote computing system based upon the received configuration data.

13. The method of claim 9, further comprising a step for transmitting a software application to the remote computing system for accessing the conference data set in the selected conference data set format.

14. The method of claim 9 wherein the conference data set is accessible using a web browser on the remote computing system.

15. The method of claim 9 further comprising storing the conference data set in a memory device.

16. The method of claim 9 wherein the conference data set comprises at least one of conference presentation documents, conference audio data, and conference video data.

17. The method of claim 9, further comprising receiving chat data from the remote computing system.

18. The method of claim 9 wherein the conference data set is transmitted from a web site accessible from a World Wide Web.

19. A method of directing each conference participant of a plurality of remotely located conference participants selected to receive a conference data set for access on a remote computing system to an appropriate conference data set in real time, comprising:

providing a web page suitable for access by the plurality of remotely located conference participants; and for each conference participant of the plurality of remotely located conference participants selected to receive a conference data set for access on a remote computing system:

receiving configuration information from the conference participant for the remote computing system to be used for accessing the conference data set via the web page;

generating in real time a plurality of transmission web pages based on respective configuration data received from the plurality of remotely located conference participants, each of the transmission web pages providing the conference data set in respective formats;

selecting a transmission web page from among the plurality of transmission web pages for the conference participant based on the received configuration information and directing the conference participant to the transmission web page; and transmitting an appropriate conference data set from the transmission web page to the conference participant, wherein the appropriate conference data set is formatted in real time with a format compatible with the remote computing system.

20. The method of claim 19, further comprising providing the remote computing system with a software application for accessing the appropriate conference data set.

21. The method of claim 19 wherein the transmission web page transmits the appropriate conference data set in a multicast mode.

22. The method of claim 19 wherein the transmission web page transmits the appropriate conference data set in a unicast mode.

23. The method of claim 19 wherein the conference data set includes documents displayed at a conference.

24. A method for receiving a conference data set in real-time from a remotely located conference provider, comprising:

providing computing system configuration information to the remotely located conferencing provider;

locating a remote conference transmission web page from a plurality of remote conference transmission web pages providing a corresponding conference data set based on the provided computing system configuration information;

downloading the corresponding conference data set in real-time over a network from the remote conference transmission web page; and accessing the corresponding conference data set.

25. The method of claim 24, further comprising a step for sending chat data to the remote conferencing provider.

26. The method of claim 24 wherein the corresponding conference data set includes least one conference document data, conference audio data, and conference video data.

27. The method of claim 24, further comprising a step of receiving conference audio data through a telephonic network from the remote conferencing provider.

28. The method of claim 24 wherein the network is an intranet.

29. The method of claim 24 wherein the network is an internet.

30. The method of claim 24 wherein the corresponding conference data set is accessed using web browsing software.

31. The method of claim 24 wherein the step of accessing the set of conference data set is delayed and occurs at a time following real-time compilation of the conference data set.

32. A method of preparing an appropriate conference data set for transmission to a remotely located conference participant in real time, comprising:

encoding in real time each conference data item of a plurality of conference data items using at least one transmission format to form a plurality of encoded conference data items;

forming a plurality of conference data sets by combining encoded conference data items of the plurality of encoded conference data items and creating in real time a plurality of transmission web pages based on respective transmission formats to provide the conference data sets, respectively.

33. The method of claim 32, further comprising:

receiving computing system configuration information from the remotely located conference participant; and determining an appropriate conference data set from the plurality of conference data sets using the computing system configuration information; and transmitting the appropriate conference data set to the remotely located conference participant.

34. The method of claim 32, wherein the plurality of conference data sets are made available to the remotely located conference participant from one or more of the transmission web pages.

35. A data structure for transmission of conference data to a conference participant remotely located from a conference in real time, comprising:

a plurality of conference data sets encoding in real time the conference data into respective formats; and a plurality of transmission web pages generated in real time and providing the conference data sets, respectively, wherein each of the conference data sets includes conference document data; conference audio data; and conference video data, and wherein the conference document data, conference audio data, and conference video data are synchronized to provide the conference participant with a real-time presentation of the remotely located conference.

36. The data structure of claim 35, further comprising conference schedule data.

37. The data structure of claim 35 wherein the conference document data pertains to presentation information displayed at the conference concurrently with the conference audio data and the conference video data.

* * * * *